Patented Nov. 3, 1953

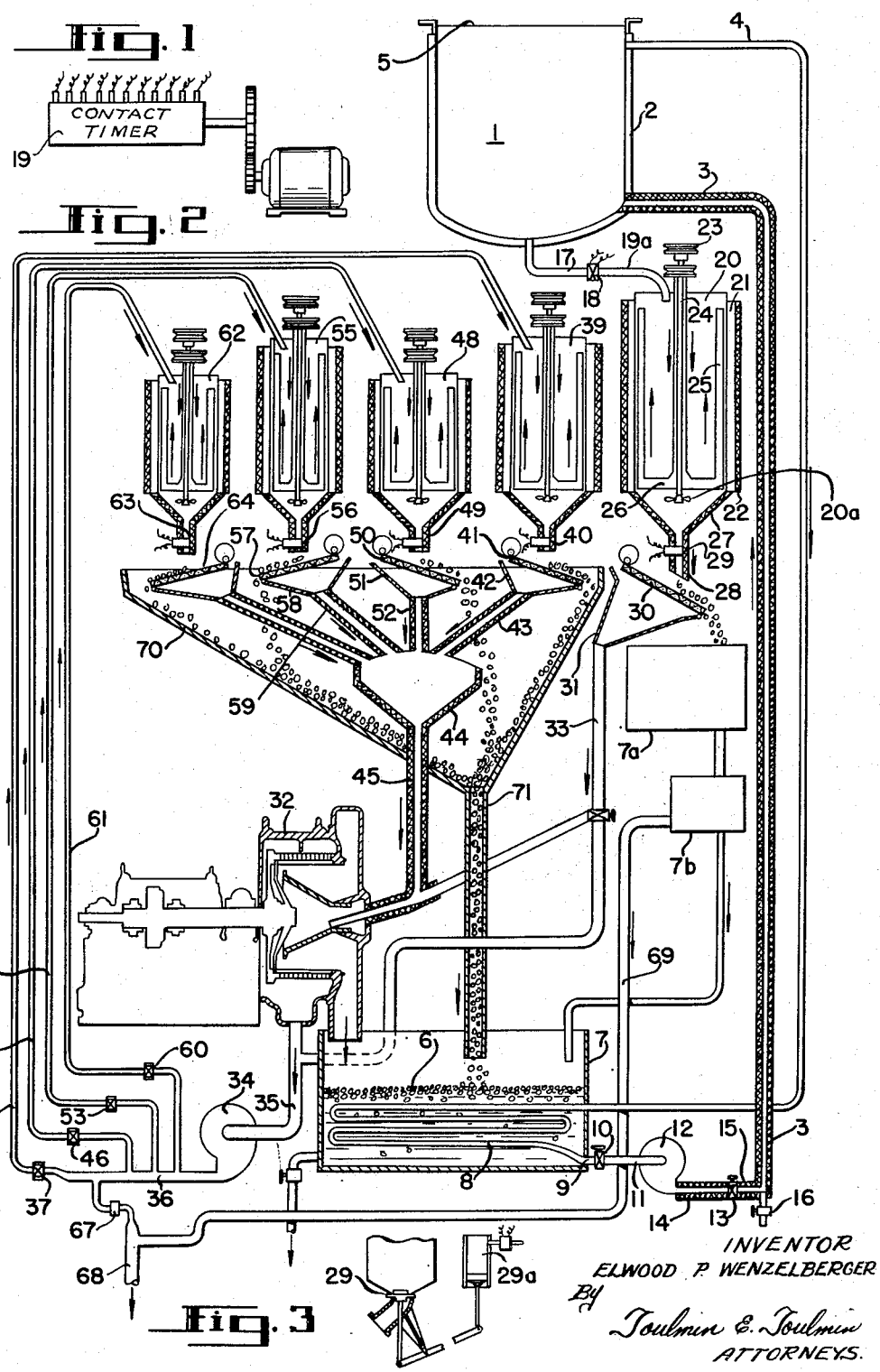

2,657,555

UNITED STATES PATENT OFFICE 2,657,555

METHOD OF DEHYDRATION BY FREEZING

Elwood Paul Wenzelberger, Dayton, Ohio, assignor to The Commonwealth Engineering Company of Ohio, Dayton, Ohio, a corporation of Ohio Application July 3, 1950, Serial No. 171,936

7 Claims. (Cl. 62—170)

This invention relates to a method of dehydration by freezing the solvent of solutions and/or suspensions.

More particularly, it relates to low temperature dehydration of fluids bearing heat sensitive constituents.

It is a particular object of my invention to provide a rapid and economical means and a method of removing water from fruit juices, beer, wines, pharmaceuticals such as antibiotics, heat sensitive resins, coffee, milk, and vegetable juices. This list is not exclusive, but is merely supplementary.

It is also an object of this invention to provide a method wherein a juice is progressively frozen at temperatures which result in formation of fine crystals of ice, readily separable from the juice.

The concentrate from a first freezing operation then is delivered ice free, or in a condition in which there is a small amount of seed ice, to the next successive freezing step carried out at a lower temperature.

It is a further object of this invention to recover any pulp material removed with the ice in the first freezing operation for return to the concentrated juice.

This results in a final concentrate from which nothing has been removed except the water and the water removal has been effected without detriment to the vitamins, volatile oils, tastes, or other characteristics of the product.

It is a further object to increase the freezing capacity of the equipment by reducing the load on the centrifuge.

It is a further object to reduce the power load and the time factor in processing by eliminating the necessity for very low sub-zero temperatures.

It is also an object to eliminate the time element and power factor in the use of heat and vacuum.

It is an object to provide a method in which a liquid having a certain percentage of solids will have its temperature reduced from its approximate initial ice forming point by stages, while at the same time, preventing the formation of white ice and of solid freezing through the production of relatively small ice crystals, substantially free of solids, due to the material being kept in a state of agitation.

It is an object of this invention to associate with this stage system a high volume heat exchange capacity in association with means for rapidly changing the liquid interface in contact with freezing surfaces with means for ample cooling or freezing area and with means for providing a flow of refrigerant capable of removing the heat as fast as it is absorbed. The ice thus formed is a fine crystalline ice slush having a large ice crystal area and continuous movement for further reseeding and formation of ice crystals for the extraction of water.

It is an additional object to provide that the difference in temperature between the refrigerant and the juice is also the approximate difference in number of degrees between the temperatures of the liquid composition in the different stages.

It will be observed that in this process instead of using a very low temperature and endeavoring to reduce the temperature as fast as possible to get the maximum freezing, this process uses the opposite course of a relatively small differential between the temperature of the liquid bearing solids and the refrigerants and a small differential between the stages and the major portion of the stages being at a temperature usually above zero degrees Fahrenheit.

It is a further object to provide means of agitation to prevent the adherence of ice to the walls of the container, to maintain the ice in a state of continually controlled agitation, so that the ice formed in stages subsequent to the first can be removed with a minimum of juice and solids entrained or accumulated by the ice.

It is a further object to provide a process wherein a large portion of the ice is segregated and only the concentrated liquid and a minor portion of the ice generally small crystals, are processed in the centrifuge.

It is an additional object to utilize the ice and ice water for reduction of the refrigeration load and for use in the initial precooling of the raw juice supply.

It is an object of this invention to provide a series of containers, the temperature of each container being lower than the temperature of the preceding container of the series, and to selectively remove the juice from each container independently of the other containers and remove the large ice crystals from the juice so removed and return the concentrated juice to the next container, and ultimately to remove the finally dehydrated juice for packing.

It is a further object to provide for rapid dehydration through rapid crystal formation and prevention of the formation of large crystal aggregates by agitation in order that small discreet crystals may be produced which occlude a minimum of liquid and solids.

It is to be understood that, if white ice forms, it is exceedingly difficult to remove and has a tendency to clog and plug the mechanism and causes great difficulty in entrainment of juices and solids.

Another advantage of this mechanism is that it is unnecessary to fortify the resulting product with raw juice. It is current commercial practice with vacuum treated orange juice as an example to fortify the juice when dehydrated by adding about 25 percent of raw juice.

Concentration by my method can be carried to a high degree with no injury to the juice, and it can be reconstituted in the hands of the user by the addition of requisite water. Nothing is lost from the juice except water and nothing is added. Heat is eliminated so as not to disturb heat sensitive materials being processed.

In the light of the foregoing, the drawings illustrating one form of the mechanism for practice in this process will be more fully understood.

Referring to the drawing:

Figure 1 is a diagrammatic view of the complete mechanism for continuous and progressive dehydration;

Figure 2 is a view of the automatic electric control system; and

Figure 3 is a detailed view of a valve used at the bottom of the discharge freezing tanks.

It will be observed that the process of this invention is based on the principle of pure ice crystal growth and the removal of these ice water crystals from the mother liquor in stages.

It also involves the segregation of ice crystals of predetermined size and of such purity as not to make centrifuging of the ice a necessity before the liquid is delivered to the centrifuge where the liquid is rendered substantially ice free.

The principle involved in my step freeze method is based on the theory that pure ice can be formed as crystals in flotation by controlling the freezing and agitation conditions so that there is a relatively small differential between the ice forming point of the solution and the refrigerating medium, amounting to about a 5° differential.

It is also based upon the fast formation of ice and the regulation of ice crystal size to avoid formation of white ice which occludes solids, freezes to large agglomerates, and prevents clean separations of ice and liquid.

When there is a relatively small differential between the initial ice forming point of water of the solution and the temperature maintained in the container by the refrigerating medium, the transformation of water to ice takes place within a time interval, within which interval the ice forming point of the solution is lowered to approximately the temperature imposed upon the solution in the container and ice formation ceases, the time interval being determined by the rate of heat transferred to the refrigerating medium.

The heat transfer, it has been found, can be effected while maintaining small temperature differentials, if a ratio of one square foot of refrigerating surface for each one to one and a half gallons or less of liquid is maintained.

When such ratios are held substantially constant, the time period, for example, 12 to 20 minutes, remains substantially constant regardless of the quantity of liquid being processed.

To be commercially feasible the process must have a high volume capacity. In this system the capacity is great because the time interval for maximum ice formation is under direct control at all times and the series of containers integrated in their operation, so that liquid only stays in each tank long enough for formation of the maximum ice content or ice crystals of maximum size for that temperature, and as a consequence thereof reaches the maximum concentration for that stage before the resultant solution is moved to the next container, whose temperature is lower than the temperature at which ice will again form in the solution. The result of this repetitive operation is to produce gradual but uniform crystal growth.

If this uniform heat transfer could be accomplished without any agitation, large crystals would form. The type of agitation I use creates relatively small crystals and serves two other functions.

A wiping blade agitator removes any ice which otherwise would cling to the cold sides of the vessel. This is removed as fast as it forms. This ice immediately acts as a seeding process to grow more crystals throughout the volume of the liquid.

This wiping agitation is performed by a relatively slow speed agitator of about 125 R. P. M.

The other agitator (at higher speed, i. e. about 800 to 900 R. P. M.) prevents large crystal growth, producing small, pure ice crystals. It also prevents the crystals so formed from floating to the top of the liquid where they would aggregate and coalesce together, to form a solid mass of ice which would occlude juice.

By forming large numbers of individual small crystals, continually in motion in the liquid, they remain unattached to each other with a uniform dispersion of ice crystals in the liquid medium. Being a liquid with ice slush it becomes easy to transport it or flow it through pipes from one piece of apparatus to another.

The tabulation given later is suggestive of the ratio of temperatures. It has been found that these temperatures, while typical, represent a rule of action that secures the desired result.

The maintenance of temperatures, which are continually being lowered, maintains the ice as individual crystals, solid in form and easily centrifuged.

I have found that by first cooling a liquid bearing solids and adjusting the difference between the temperature of the liquid and the temperature of the refrigerant by a small differential of approximately 5° and then agitate the liquid bearing the solids or seed with ice crystals, or both, the liquid will immediately form ice very rapidly and the temperature rise back to the ice forming or congealing point. To prevent such ice so forming, occluding some of the solution and the solids in the ice, and to prevent the crystals of ice from growing large and forming the ice, I provide continuous agitation to prevent cooling and ice formation at the normal congealing point, particularly in large crystals and in white ice. I secure the result of fine crystals in a large mass.

I find it desirable to agitate at slow speed in one direction and simultaneously at high speed in another direction so as to effect the maximum heat transfer at the low differential between the refrigerant on the outside and the liquid bearing the solids on the inside.

In order to obtain these fine crystals in a relatively pure form without solids, the temperature of the cooling liquid must be held practically at a constant temperature, the temperature being maintained at a predetermined lower temperature, below the ice forming temperature of the solution.

In order to speed the ice crystal formation under these conditions, the system must possess high heat exchange capacity. This may be brought about by first, agitation which brings about rapid change of the liquid interface on contact with the freeze surfaces, and, secondly, by maintaining a ratio of one square foot of cooling surface for each one to one and a half gallons of solution being treated, and thirdly, by maintaining the flow of refrigerant capable of removing a relatively large quantity of heat.

The above process is based upon a system of heat exchange in which a low differential is maintained between the ice forming temperature of the solution and the temperature of the solution.

I also find it important that the major portion, in many instances, of the stages of progressively lowering the temperature shall be above zero, and I also find it important that the successive stages be at relatively small temperature reductions, such as about 5° and 7° F., and that the temperature of the liquid in the second stage should be approximately the temperature of the refrigerant in the first stage, and so on. It will be understood that these differentials will vary with the liquids and the solids, but the principle of the operation remains the same.

By avoiding extremes of temperature, quick freezing, and by maintaining easy stages of lowering temperatures and modest differentials between the refrigerant and the liquid while causing agitation, a steady freezing of small ice crystals will take place and rapid dehydration can be effected without occluding other liquids and solids than water.

By starting, as in the case of orange juice, at a tank temperature of 23° F. above zero, with an outside temperature of 18° F., then a temperature in the next tank of 18° F., with an outside temperature of 13° F., then a tank temperature of 13° F. with an outside temperature of 8° F., and in the fourth tank a temperature of 8° F. with an outside temperature of 3° F., and in the last tank a temperature of 3° F. with an outside temperature of −2° F., clear ice crystals can be secured that are easily maintained by the stirrer in free movement with minimum crystal size and the maximum freezing capacity for the temperature applied. This principle of a multiple series of steps, starting the temperature just about at the freezing point of the juice and progressively reducing it and progressively removing water by freezing, enables this result to be secured.

In order to economize refrigeration, the first two stages are normally connected to one compressor and the remaining stages to another.

1 is a supply tank for raw juice that is maintained at a temperature of about 34° F. through the circulation of ice water, previously cooled by the ice, through the jacket 2, supplied by the pipe 3, and discharged through the pipe 4.

A cover 5 is maintained over the raw juice and where desired air can be eliminated and other steps taken to preserve the material from contamination, bacteriological and enzyme action. This ice water is supplied from the melting ice 6 in the tank 7. Ice in tank 7 is from the freezing stages following the first, if the material being concentrated is of such a nature as to contain some pulp. Ice from stage one, if it contains some pulp, is delivered to a separate tank 7a. The pulp is then separated from the ice water as they run from the tank by suitable means 7b, such as a screen, and the pulp transferred to the concentrated fluid from the last stage.

The refrigerant at 8 passes through the pipe 9, valve 10, pipe 11, pump 12, valve 13, pipe 14, pipe 15, into pipe 3. 16 indicates a valve for a drain. The waste ice water can be sent to the refrigerating machine for condensation use or otherwise employed for cooling.

The tank 1 is provided with a drain pipe 17, controlled by the electrically operated valve 18. Each of the electrically operated valves, of which 18 is one, is connected to a master sequence contact timer 19, which is actuated by a motor whereby the pipe 19a discharges the juice at about 34° temperature into tank 20, which is surrounded by a freezing chamber 21 connected to a suitable source of refrigeration and insulated at 22. The same construction applies to the other tanks. The refrigeration system is conventional and is not shown.

In each of the tanks there is a motor driven stirrer comprising a pulley 43, a shaft 44, and vertical and horizontal stirrer blades 45 and 46. In order to facilitate the discharge of the ice and to prevent the discharge from freezing, the discharge hopper 27 has no refrigeration. It is, therefore, at a higher temperature. Likewise, the discharge pipe 28, controlled by the valve 29 has no refrigeration. Valve 29 is actuated by a link mechanism from the solenoid 29a.

The propeller 20a has an 18° pitch. It is driven by a shaft which runs through the center of the hollow wiper shaft 20b for keeping the walls of the container 20 free of ice. The propeller 20a rotates clockwise at 600 to 800 R. P. M., pushing downward, and the wiper 20b counter-clockwise at about 125 R. P. M.

Liquid and unsegregated ice which passes through a vibrating screen 30 is accumulated in a hopper 31 and is delivered to a centrifuge 32 through conduit 33. The ice is delivered from screen 30 to tank 7a where it melts.

The partially dehydrated juice passes from centrifuge 32 to pump 34 through pipeline 35. The pumped juice flows through header 36, valve 37 and pipe 38 for delivery of juice from the first stage into the tank 39.

The juice delivered to tank 39 is thoroughly contacted with crystals and seeded so that rapid formation of ice crystals is facilitated. The juice passes from tank 39 through valve 40 to the screen 41. At the screen 41 crystals of a predetermined size are removed.

The partially dehydrated juice and unsegregated ice crystals are delivered through hopper 42 and pipe 43 to accumulator tank 44 and thence through pipe 45 to centrifuge 32. From the centrifuge the juice passes through pipe 35, pump 34, header 36, valve 46 and pipe 47 to the third tank 48. After ice crystal development, the tank is emptied through a valve 49 to the screen 50.

After being screened the juice and unsegregated crystals pass through hopper 51 and pipe 52, accumulator tank 44 and pipe 45 to the centrifuge 32. After separation of the smaller ice crystals in centrifuge 32, the juice passes through pipe 35 in the same manner as before to pump 34 and is moved through header 36, valve 53 and pipe 54 to tank 55.

The concentrated juice passes through valve 56 to screen 57. After screening the juice and unsegregated crystals pass through hopper 58 and pipe 59, accumulator tank 44, and pipe 45 to centrifuge 32. From the centrifuge, the concentrated juice passes through pipe 35 to pump 34 and thence through header 36, valve 60 and pipe 61 to the final tank 62.

The dehydrated concentrate and crystals pass through valve 63 to screen 64. The juice and fine crystals pass through hopper 65 and pipe 66 to accumulator tank 44, and thence through pipe 45 to centrifuge 32, where all ice is removed.

The dehydrated concentrate passes through pipe 35, pump 34, valve 67 to conduit 68 where it is mixed with pulp delivered through conduit 69 from filter 7b.

Ice separated by screens 41, 50, 57 and 64 is received in a hopper 70 and delivered through conduit 71 to melting tank 7.

Each time the juice is delivered to its respective tank, a freezing period is allowed in order to produce a new crop of pure ice crystals, only of sufficient length for the freezing point of the solution to be lowered to approximately the temperature in the tank which are removed in each stage by the screen.

The final product can be either shipped in frozen form in the sense that it is refrigerated, or it can be packed and preserved without refrigeration if the concentration is more than 60 percent. The sugar enables preservation to be successfully accomplished over an extended period of time at room temperature. It will be understood suitable provisions are taken for sanitation, for the prevention of enzyme action and for the prevention of bacteria and other reasons that might cause spoilage.

The practical operation of the machine in this system and method not only provides a continuous method, but is a very rapid one in the production of dehydrated juice. The formation of ice is very rapid, the crystals are relatively uniform and small, they have very little juice entrained in them being materially less than one-half of one percent.

As the raw juice is being supplied to the supply tank continuously or at intervals, it is possible to have a continuous flow into the main tank at will, so that all tanks in the system are always operating, and the pump which is common to all tanks is always operating so that none of the ice or the ice water is wasted, but all of it is applied to the refrigeration of the juice.

The problem of the formation of white ice has been overcome and clear crystal ice is formed by this method. The crystals are small and of great number, possessing the maximum cooling area and the maximum nuclei to facilitate very rapid freezing. The slush is formed rapidly and this slush and the dehydrated liquid can be easily handled by gravity through the system.

FREEZING CONDITIONS AND PROCEDURE

Tank 20 is refrigerated so that the juice introduced into it, from tank 1, at 34° F., is brought down to about 5° below the critical congealing or ice forming point.

Each successive stage of freezing is then maintained at 5° lower than the preceding stage. The refrigerant is controlled for each tank at a differential of 5° lower than the juice in the tank.

A typical set of examples of how this works is as follows:

*Example I.—12% solids—orange juice*

Initial ice forming point—28° F.

1 Tank—Juice at 23° F., refrigerant 18° F.
2 Tank—Juice at 18° F., refrigerant 13° F.
3 Tank—Juice at 13° F., refrigerant 8° F.
4 Tank—Juice at 8° F., refrigerant 3° F.
5 Tank—Juice at 3° F., refrigerant —2° F.

*Example II.—10% solids—cider vinegar*

1 Tank—Juice at 27° F., refrigerant 22° F.
2 Tank—Juice at 22° F., refrigerant 17° F.
3 Tank—Juice at 17° F., refrigerant 12° F.
4 Tank—Juice at 12° F., refrigerant 7° F.
5 Tank—Juice at 7° F., refrigerant 2° F.

Different liquids have different initial congealing points so that a temperature scale is established for each material processed. Various temperatures at which ice crystals may form may be used in each or all tanks.

Typical agitation by the wiper blades is caused by a speed of 125 R. P. M. and of the propeller blades of 700–800 R. P. M. These speeds are varied according to the size of the tank and material being processed.

Suitable mechanism for transferring ice from one tank to another can be employed, but is not shown. It has been found desirable to select the particular tank for delivery to the other tanks according to the necessity for seeding and the type of liquid being processed. A counter-flow of ice, under some conditions, is desirable, but one of the particular advantages of this method is the very rapid freezing by stirring and agitation.

It will be understood that the following claims comprehend various changes in temperature, mechanism, speed of stirring and procedure according to the materials being processed.

I claim:

1. In a method of dehydrating a liquid composition of relatively low solids content, the steps of lowering the temperature of the composition below the solidification temperature of the crystallizable solvent therein; agitating the composition and the solvent crystals to control crystal size and to prevent agglomeration; agitatingly removing crystals beyond a predetermined size from the composition; and thereafter separating the crystals of smaller size and beyond a second predetermined size from the composition by centrifugal force, whereby the composition is concentrated to the extent of the solvent removal, repeating the solidification of crystallizable solvent in the more concentrated liquid composition by application of lower temperature, and again removing and separating the crystals from the concentrated composition.

2. In a method of dehydrating a liquid composition of relatively low solids content, the steps of freezing a portion of the water in the composition by abstracting heat from the composition until the ice forming temperature of the composition is lowered to the temperature imposed by the cooling operation; agitating the composition and the ice crystals to control crystal size; removing from the solvent by agitation the solvent crystals grown to predetermined size; separating the crystals of smaller size from the composition by centrifugal force; repeating the freezing of ice in the more concentrated solution by application of lower temperature; again agitating the composition to control crystal size and increase the number of ice crystals; and again removing and separating the crystals from the concentrated composition.

3. In a method of dehydrating a liquid composition of a relatively low solids content, the steps of: freezing a portion of the water in the composition; agitating the composition and ice crystals to control crystal size; removing from the liquid by agitation the occluded-material-free crystals of predetermined size whose growth is completed under the imposed freezing conditions; separating the crystals of smaller size from the composition by centrifugal force; successively and by application of progressively lower temperatures freezing additional portions of the water; removing and separating from the liquid after each freezing operation the ice crystals in a like manner until a composition of predetermined final solids concentration has been attained.

4. In a method of dehydration of a liquid composition, cooling the liquid bearing solids to a temperature differentially lower than the ice forming temperature of the solution by a small increment; causing ice crystals to form in agitated composition whereby the ice forming temperature of the liquid is lowered to substantially the temperature imposed upon the partially dehydrated liquid; removing by agitation the solvent crystals grown to predetermined size; separating the crystals of beyond a smaller predetermined size from the composition by centrifugal force; reforming additional ice crystals seeded from those retained in the composition while reducing the temperature to produce a reduction in the water content; and removing the ice crystals at each stage in unagglomerated form.

5. In a method of providing high volume liquid concentration capacity; the steps of agitating a liquid to cause a rapidly changing liquid interface in contact with the freezing surface whereby heat removal is of high capacity while maintaining a small temperature differential of approximately 5° between the ice forming temperature of the refrigerant and the initial temperature of the solution in the container for effecting formation of fine ice crystals, said agitation being effected by directing the movement in the liquid bearing composition at different velocities in different directions; conducting the composition and ice crystals grown to maximum size under the imposed freezing conditions from the freezing zone; removing by agitation solvent crystals grown to predetermined size; separating the crystals of beyond a smaller predetermined size from the composition by centrifugal force whereby the composition is concentrated to the extent of the solvent removal; and returning the partially concentrated liquid for treatment under conditions inducing progressively lower temperatures and ice formation.

6. In a method of providing high volume liquid concentration capacity the steps of: agitating a liquid to cause a rapidly changing liquid interface in contact with the freezing surface whereby heat removal is of high capacity while maintaining a small temperature differential of approximately 5° between the ice forming temperature of the refrigerant and the temperature of the solution in the container for effecting the formation of fine ice crystals, said agitation being effected by directing the movement in the liquid bearing composition at different velocities in different directions; conducting the composition and ice crystals grown to maximum size under the imposed freezing conditions from the freezing zone; screening crystals beyond a predetermined size from the composition; centrifuging the remainder of the composition to remove smaller ice crystals of beyond a second predetermined size; and returning the partially concentrated liquid for treatment under conditions inducing progressively lower temperatures and ice formation.

7. In a method of dehydration, subjecting the liquid bearing solids to a temperature below the freezing point of the water therein; abstracting the heat at a temperature differential of approximately 5° between the refrigerant and the liquid bearing solids; agitating the liquid to cause formation of ice crystals; screening the crystals beyond a predetermined size from the composition; centrifuging the remainder of the composition to remove smaller ice crystals beyond a predetermined size; and again applying to the liquid bearing solids a similar differential of temperature but at a temperature of the refrigerant approximately 5° lower than the first temperature while still maintaining at the second stage the same temperature differential as before.

ELWOOD PAUL WENZELBERGER.

References Cited in the file of this patent
UNITED STATES PATENTS

| Number | Name | Date |
|---|---|---|
| 1,359,911 | Oman | Nov. 23, 1920 |
| 1,738,275 | Baker | Dec. 3, 1929 |
| 2,337,317 | Eggert | Dec. 21, 1943 |
| 2,436,218 | Malcolm | Feb. 17, 1948 |
| 2,448,802 | Holzcker | Sept. 7, 1948 |
| 2,503,395 | Leboeuf | Apr. 11, 1950 |
| 2,550,615 | Stansbury | Apr. 24, 1951 |